(12) United States Patent
Wilson

(10) Patent No.: US 7,523,730 B2
(45) Date of Patent: Apr. 28, 2009

(54) CARBURETOR SPACER

(76) Inventor: Keith D. Wilson, 5842 NW. 41st La., Coconut Creek, FL (US) 33073

( * ) Notice: Subject to any disclaimer, the term of this patent is extended or adjusted under 35 U.S.C. 154(b) by 0 days.

(21) Appl. No.: 12/001,723

(22) Filed: Dec. 12, 2007

(65) Prior Publication Data

US 2008/0135009 A1    Jun. 12, 2008

Related U.S. Application Data

(60) Provisional application No. 60/874,329, filed on Dec. 12, 2006.

(51) Int. Cl.
*F02M 29/00* (2006.01)
*F02M 35/10* (2006.01)

(52) U.S. Cl. .................. 123/184.46; 267/136

(58) Field of Classification Search .......... 123/1 A, 123/184.21, 184.22, 184.23, 184.24, 184.25, 123/184.26, 184.32, 184.34, 184.35, 184.38, 123/184.39, 184.42, 184.43, 184.46, 184.51, 123/184.59, 189.4, 192.1, 191.2, 198 E, 585, 123/590, 591, 592, 593; 267/2, 136, 292, 267/293, 152, 153, 182; 48/189.4, 189.5; 285/363, 364

See application file for complete search history.

(56) References Cited

U.S. PATENT DOCUMENTS

| | | | | |
|---|---|---|---|---|
| 5,392,752 | A * | 2/1995 | Brogan et al. | 123/591 |
| 7,017,544 | B2 * | 3/2006 | Kostecki | 123/184.46 |
| 2006/0214341 | A1 * | 9/2006 | Sugiura et al. | 267/293 |
| 2006/0254551 | A1 * | 11/2006 | Fields | 123/184.46 |

\* cited by examiner

*Primary Examiner*—Michael Cuff
*Assistant Examiner*—Hung Q Nguyen
(74) *Attorney, Agent, or Firm*—Richard M Saccocio

(57) ABSTRACT

A carburetor spacer is provided with an isolation member to isolate the flow of atomized fuel from a carburetor to an intake manifold of an internal combustion engine comprising first and second hollow members fitting one inside the other and an elastomeric member interposed between said fitted hollow members. The elastomeric member also serving to thermally insulate the flow of fuel-oxidizer from heat produced by the engine. Thus, the isolation member helps prevent the fuel from reverting to a liquid state before being introduced into the cylinders of the engine and by reducing the heat input to the fuel-oxidizer mixture, less expansion of the mixture occurs before being introduced into the engine's cylinders. Less expansion results in more of the mixture of the fuel-oxidizer can be input to the cylinders resulting in a greater power output by the engine.

8 Claims, 3 Drawing Sheets

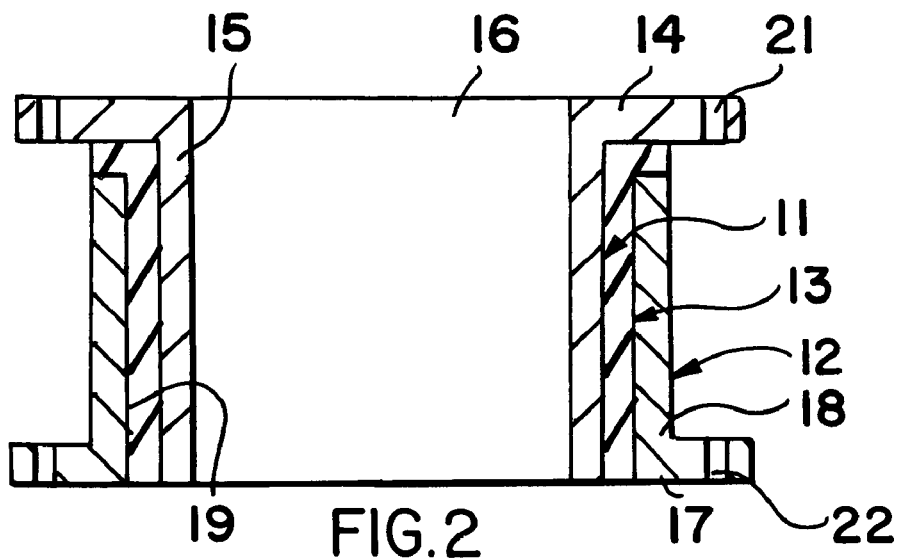
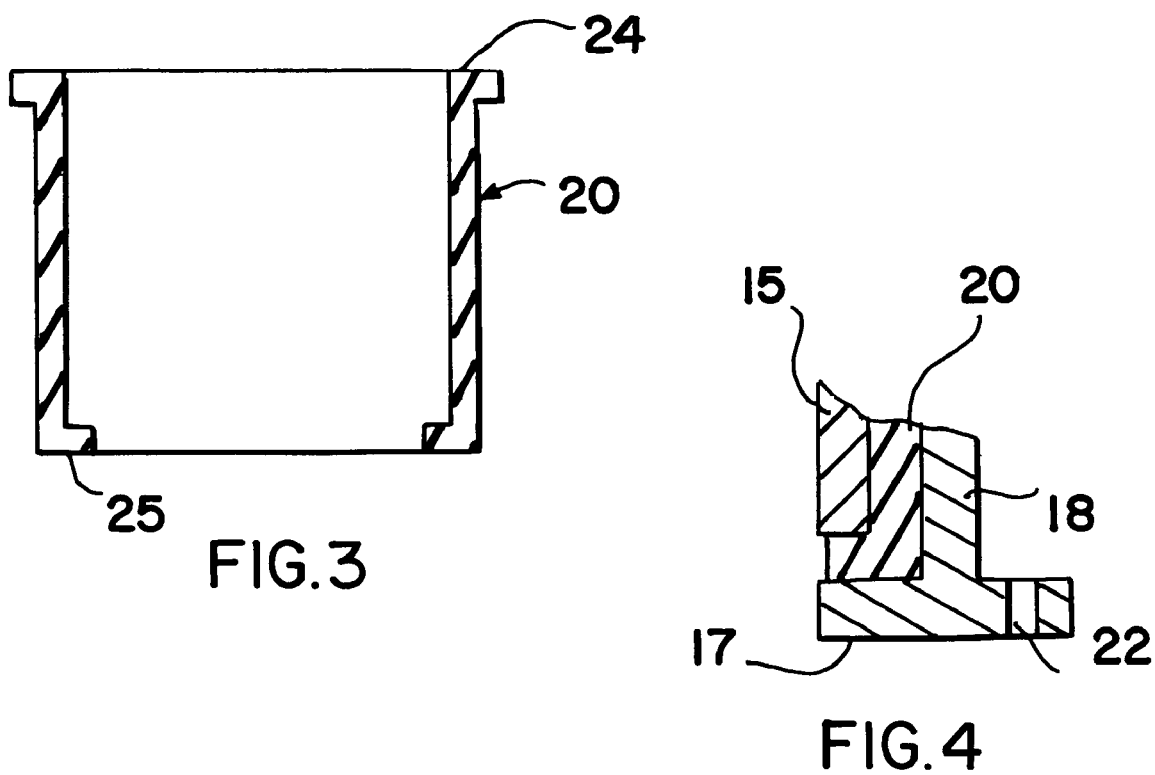

CARBURETOR SPACER

CROSS REFERENCE TO RELATED APPLICATIONS

This application is related to U.S. provisional Application Ser. No. 60/874,329 entitled Carburetor Spacer, filed Dec. 12, 2006

BACKGROUND OF THE INVENTION a) Field of the Invention

This invention relates in general to the field of improved internal combustion engine performance, and in particular to methods and apparatus to assist in stabilizing the flow of flow of fuel mixture into the intake manifold of a carbureted internal combustion engine by providing and improved carburetor spacer b) Description of the Prior Art It is advantageous for carbureted internal combustion engines, especially engines used in performance automobiles or racing automobiles, to increase performance by developing maximum power and torque throughout the revolutions per minute (RPM) range of the engine. Such performance is usually manifested in engine throttle response and acceleration and of course top speed.

In a carbureted engine, the carburetor serves to determine the amount of fuel and oxidizer to be provided to the cylinders for burning and production of power. Thus air, an oxidizer, or another oxidizer, such as nitrous oxide, and fuel, usually gasoline, are input to a carburetor which meters both the air and oxidizer to provide a predetermined ratio of fuel and oxidizer. The carburetor also atomizes or vaporizes the fuel and mixes it with the oxidizer such that optimum burning of the fuel occurs during the power stroke of the pistons. Thus, the carburetor sets the stage for the ultimate performance of the engine. However, the output of a carburetor must be delivered in equal parts to each of the cylinders of an engine in order to continue the performance chain. An intake manifold serves this function. Many improvements have been made to intake manifolds in the nature of maintaining the previously supplied optimal mixture of the atomized fuel—oxidizer by not allowing the fuel to revert back to its liquid state and deposited out of the mixture onto one or more surfaces of the intake manifold, and to minimize pressure drop losses within the intake manifold that can inhibit the maximum flow of the fuel-oxidizer mixture.

In the relatively recent past, the performance of carbureted engines have been improved by the advent of a spacer located between the outlet of the carburetor and the inlet of the intake manifold. The spacer being exactly as it is stated, a device that adds space between the carburetor and the intake manifold. As would be expected, the spacer has been improved over the years and present day spacers significantly add to the power and torque produced by performance engines.

Present day spacers take a number of different forms. They are of different lengths, different internal sizes, have one or more flow passages, are made from different material, are manufactured by different methods such as casting, CNC machining, and the internal passages have taken on different shapes- all or any one of them to improve velocity of the fuel-oxidizer, the atomization and vaporization of the fuel, the oxygenation of the fuel and the mixing of the fuel and oxidizer. Still another improvement has been to provide means within the spacer to input an additional oxidizer and fuel. My previous U.S. Pat. No. 6,269,805, issued Aug. 7, 2001. is directed to this latter improvement.

Unfortunately, there are factors that occur during the operation and running of an internal combustion engine that tend to upset even a very carefully optimized and distributed fuel mixture. For example, the engine itself creates vibrations and resonances during its operation which can result in disturbing the atomization, vaporization, oxygenation, and distribution of the fuel mixture and therefore disadvantageously affect the output of the engine. Additional vibrations and resonances can be induced into the fuel mixture delivery system due to the engine being connected to its supporting structure. For example, if the engine is bolted directly to its supporting structure with no rubber or isolation dampening medium placed between the engine and its mounting structure, which direct bolting is often used in race cars. the probably of induced vibrations is increased. Even with the use of an isolation medium between the engine and its supporting structure, vibrations can be induced. Likewise, if the engine is used in an automobile, performance or otherwise, the road conditions can have an effect on the induced vibrations. There are probably other factors that cause and or aggravate the unwanted vibrations. As noted, the vibrations are one factor that can reduce the optimum performance of an internal combustion engine by disturbing the preferred or optimal atomization and distribution of the fuel mixture.

Accordingly, it is a primary object of the present invention to minimize the effect of the ever present resonances and vibrations on the atomization, vaporization, mixing, and distribution of the fuel mixture being delivered to the cylinders of an internal combustion engine. The present invention accomplishes this objective in a proven manner.

SUMMARY OF THE INVENTION

The present invention comprises a three piece carburetor spacer. One part of the spacer being a male member, another being a female member, and an elastomeric member. The male portion fits within the female portion leaving a space therebetween. The elastomeric member fits within the space between the male and female members and between an end of the female member and an underside of a flange of the male member. The three members comprising the spacer are held together by friction, although other methods can be used. The elastomeric member serves as a vibration and resonance isolator between the male and female portions by allowing relative movement between the male and female members. In use, the spacer is located between a carburetor and an intake manifold of an internal combustion engine; accordingly, vibrations and the resonances thereof of the engine are precluded from being induced in the intake manifold attached thereto. This in turn prevents the vaporized fuel in the fuel-oxidizer mixture from reforming as a liquid which would adversely affect complete combustion of the fuel when caused to burn in the engine's cylinders.

The preferred details of the disclosed embodiments and the advantages thereof are further described below and in conjunction with the attached drawings.

BRIEF DESCRIPTION OF THE DRAWINGS

Various other objects, advantages, and features of the invention will become apparent to those skilled in the art from the following discussion taken in conjunction with the following drawings, in which:

FIG. 2 is a cross sectional view of an assembled spacer illustrating a preferred embodiment of the elastomeric isolator and its position within the spacer;

FIG. 3 is a partial cross sectional view of another embodiment of the elastomeric isolator;

FIG. 4 is cross sectional view of another embodiment of the elastomeric isolator;

DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis as a representative basis for teaching one skilled in the art to variously employ the present invention in virtually any appropriately detailed structure. Further, the terms and phrases used herein are not intended to be limiting; but rather, to provide an understandable description of the invention.

Figure 1:
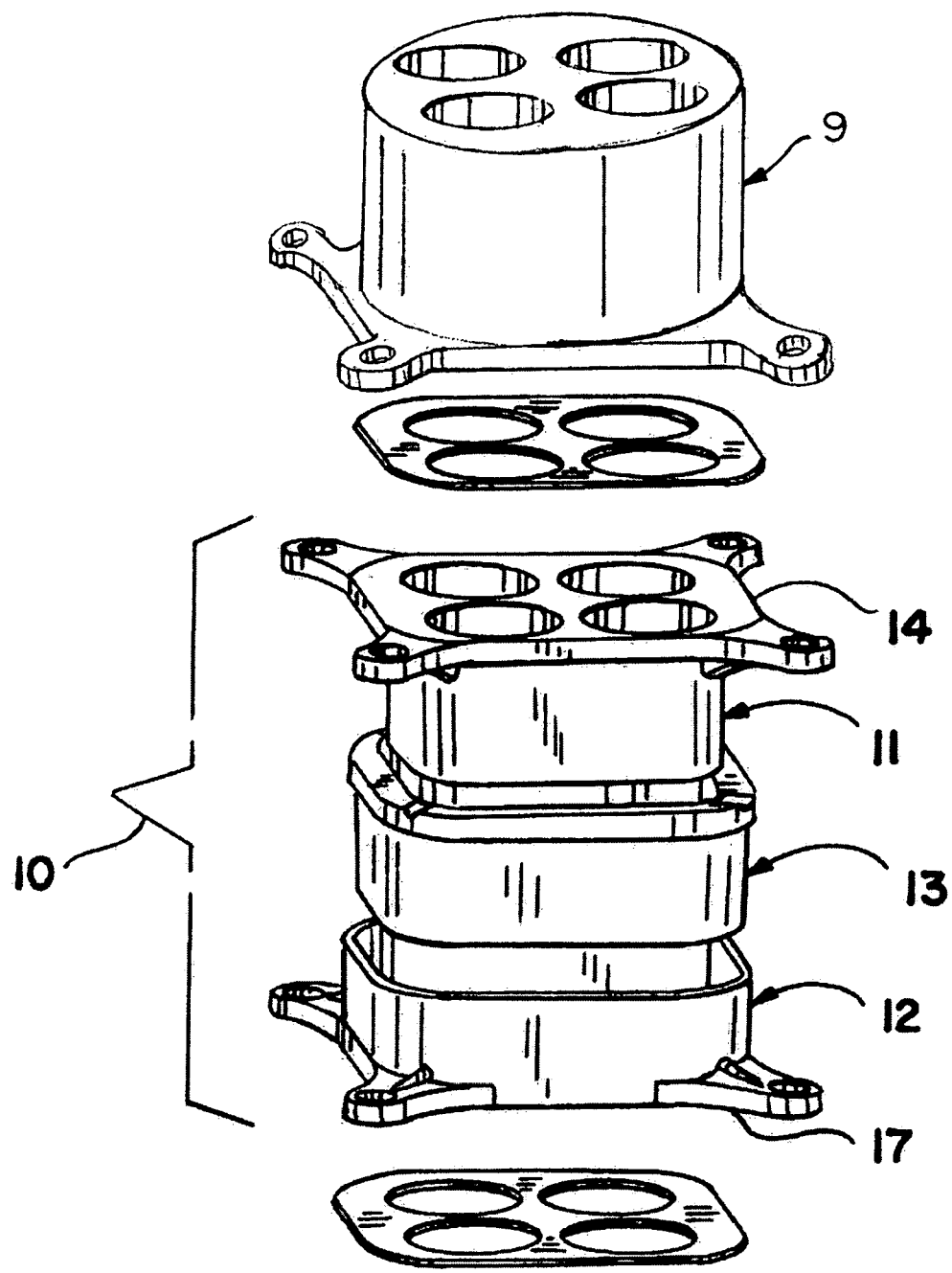
FIG. 1 is a composite, isometric rendering of the various components of the inventive spacer in combination with a standard prior art carburetor illustrating the manner in which the components are assembled; the carburetor is shown schematically and without any normally attendant lines or connections.

Reference is now made to the drawings accompanying this application. FIG. 1 is an isometric rendering of the various components which are shown in an expanded view for purposes of clarity.

Carburetor 9 is a typical prior art carburetor that is attachable to the inventive spacer. The inventive spacer comprises three major components, a male member 11, a female member 12 and an isolator member 13. The male member 11 is configured to fit within the female member 12 with a space therebetween. The space is provided to fit therein the isolator 13. Thus, the isolator is interposed between the female member and the male member. The fitup between the three parts is a close fit such that essentially no space or gap exists between the parts when they are assembled and the members are held together by friction.

FIG. 2 is a cross sectional view taken along an axial center line of the assembled spacer 10. The male member 11 includes a flange 14 at one end thereof. A hollow portion 15 depends from the flange 14. Both the flange 14 and the depending portion 15 include an opening 16 therethrough. The opening 16 provides the flow channel for the fuel-oxidizer mixture flowing from a carburetor to an intake manifold of an internal combustion engine to which the spacer 10 is adapted to be assembled therebetween. The carburetor being sealingly attached to the upper end of flange 14. The openings 21 in flange 14 provide for this attachment, such as by bolts and nuts. The seal between the carburetor and the flange can be effectuated by a gasket or other well known method of sealing a metal to metal joint.

The female member 12 includes a flange 17 and an attached extending portion 18. The extending portion 18 of female member 12 extends upward from flange 17. A through opening 19 is provided in flange 17 and extending portion 18. Opening 19 is larger than the outside dimension of the depending portion 15 of the male member 11. Thus, a space exists between the inside of the extending portion 18 and the outside of depending portion 15. Additionally, the length of depending portion 15 is longer than the length of extending portion 18. Flange 17 also includes openings 22 that for convenience are similarly sized and located in alignment with the openings 21 in flange 14. Openings 22 are used to sealingly attach the spacer 10, by the flange 17, to the intake manifold of the internal combustion engine. Usually, the flanges 14 and 17 and the depending and extending portions of members 11 and 12 are generally square with rounded corners that coincide with the outlet of a typical carburetor. For convenience and lessening of weight, the openings 21 and 22 being in located in portions of the flanges extending outward from the corners of the square.

In one embodiment, the elastomeric member 13 comprises a hollow body portion 23 and a flange-like portion 24 extending outward from one end of the body portion 23. This configuration of the elastomeric member 13 allows for the body portion 23 to fit within the space provided between the outside of depending portion 15 and the inside of the extending portion 18; and, and when the members 11, 12, and 13 are assembled, the end of the depending portion 15 and the end of the body portion 23 of the elastomeric member 13 are aligned with the lower end of flange 17. Further, when assembled, the upper end of extending portion 18 is in contact with the underside of the flange-like portion 24 of the elastomeric member 13 and the upper end of the flange-like portion 24 is in contact with the underside of flange 14. In other words, the flange-like portion 24 of elastomeric member 13 is sandwiched between the upper end of extending portion 18 and an inside surface of the flange 14 of the male member 11. Again, the close fit of the depending portion 15, the body 23 of the elastomeric member 13, and extending portion 18 relative to each other provides the friction that is used to keep members 11, 12, and 13 assembled to each other.

The assembled configuration shown in FIG. 2, in conjunction with the rubber-like properties of the elastomeric member 13 provide the spacer 10 with flexibility allowing the flanges 14 and 17, and therefore members 11 and 12, to move relative to each other in any direction. In actual tests using the inventive spacer 10, the carburetor was observed to shake randomly in all three directions due to engine vibrations and resonances, but in accordance with the flexibility of the spacer, none, or substantially none, of the shaking was transmitted to the intake manifold.

The inventive spacer, due to the presence of the elastomeric member 13 provides for thermal insulation between the female member 12 and the male member 11. This feature advantageously prevents heat from the engine environment from entering the male member 11. In turn, the avoidance of such heat transfer prevents or at least diminishes any adverse effects that might cause the vaporized fuel to revert to a liquid state Thus, the heat insulating properties of the inventive spacer 10 advantageously serves to maintain the atomization and vaporization of the fuel in the fuel-oxidizer mixture and therefore prevents a power loss that would occur without the spacer 10.

FIG. 3 illustrates another embodiment 20 of the elastomeric member 13 of the inventive spacer 10. In this embodiment, another flange-like portion 25 is attached to the body portion 27, but at the end opposite of flange-like portion 24. Flange-like portion 25 differs from flange-like portion 24, in that it extends inward of body portion 27 In order to accommodate the extra flange-like portion 25, the depending portion 15 of male member 11 and the flange 17 would be configured a shown in FIG. 4. Such configuration would allow the lower flange-like portion 25 to also be sandwiched but between the end of depending portion 15 and the upper surface of lower flange 17. Depending on the properties of the elastomeric material, this double flange-like configuration and sandwiching can provide for more relative movement between the upper 14 and lower 17 flanges and therefore more isolation from the adverse effects of vibrations and its harmonics. The heat insulation characteristics of the embodiments of FIGS. 2 and 3 would be about equal.

Figure 5:
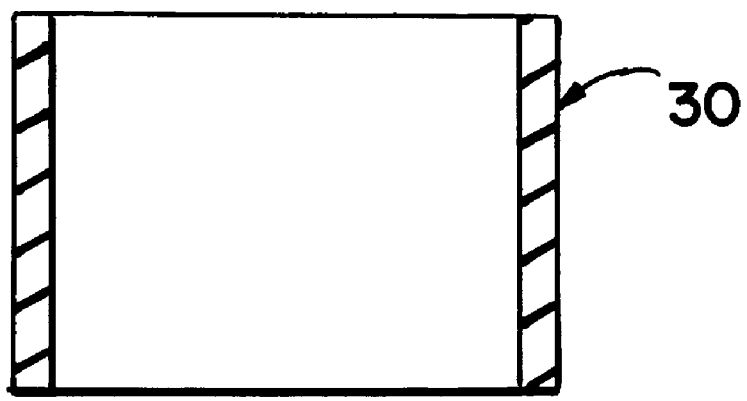
FIG. 5 is cross sectional view of another embodiment of the elastomeric isolator; and, FIG. 6 is a cross sectional view of another embodiment of the inventive carburetor spacer as provided by the present invention.

Another embodiment 30 of the elastomeric member 28 is shown in cross section in FIG. 5. In this embodiment, the elastomeric member 28 comprises only a body 29. With this configuration, the sandwiching features of the previous embodiments would be eliminated and would most probably result in a loss of some flexibility between the male and female members. However, a tradeoff would exist in that the embodiment of FIG. 5 would be simpler and less expensive to make.

In the embodiments of FIGS. 1-5 the length of the spacer 10 is substantially determined by the length of the depending portion 15 and the extending portion 18, plus the thickness of the flange-like portions, if any, of the elastomeric member, 13, 26, or 28. The length being defined as the distance from the top of flange 14 to the bottom of flange 17.

Figure 6:
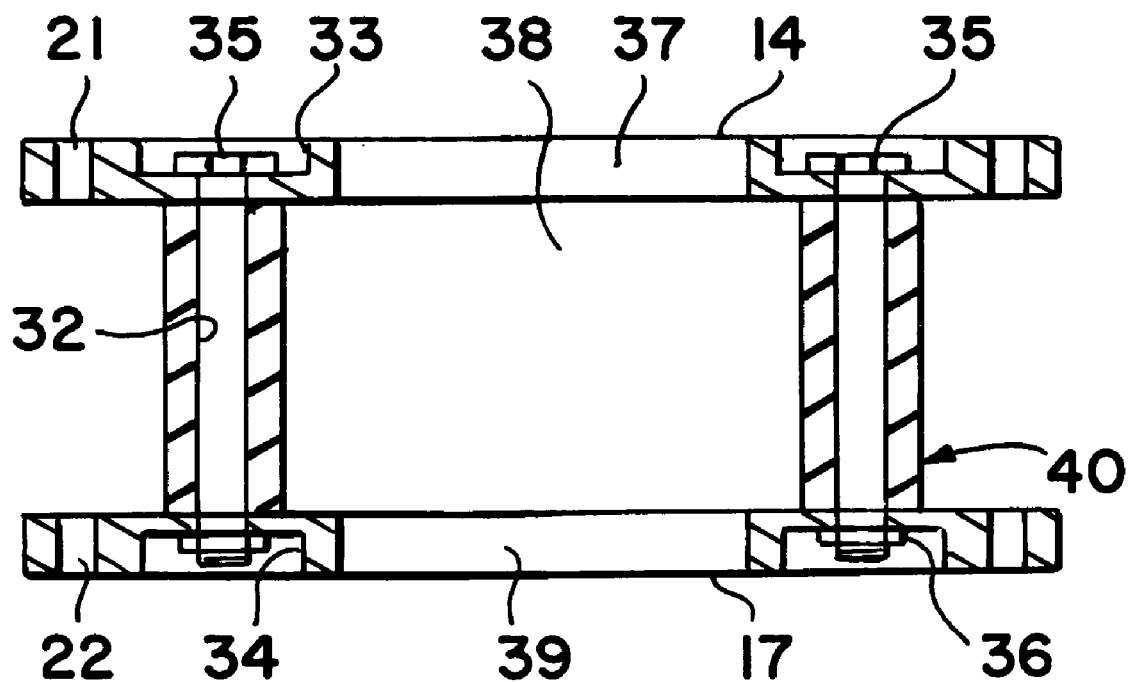

FIG. 6 illustrates, in cross section, another embodiment of an isolating spacer containing an elastomeric member that serves to minimize unwanted vibrations and provides heat insulation. In this embodiment 40, the elastomeric member 41 comprises only a body 42 as per the embodiment 30 of FIG. 5. However, only an upper flange 14 and a lower flange 17 are used in conjunction with the elastomeric member 41. The hollow elastomeric member 41, is provided with a plurality of through holes 32 that are aligned with an equal number of through and aligned countersunk holes 33 and 34 in flanges 14 and 17 respectively. Bolts 35 and nuts 36 can then used to secure the elastomeric member 41 to flanges 14 and 17. In this embodiment, 40 the through openings 37, 38, and 39, in flange 14, elastomeric member 41, and flange 17, respectively, define the flow opening in the spacer embodiment of 40 of FIG. 6. The embodiment 40 of FIG. 6 provides the additional advantage of being able to change the length of the spacer by simply replacing the elastomeric member 41 with an elastomeric member having a different length.

In all of the above embodiments, the flow opening in the spacers is not restricted to a through opening in the flanges. The upper flange 14 can be provided with any number of different flow openings and configurations as are known in the field of modern day spacers.

When the inventive spacer 10 is to be attached to an internal combustion engine, appropriate sealing gaskets, as are known in the prior, are used to create a leak free connection to a carburetor and an intake manifold. Such gaskets can be seen in FIG. 1, above and below the spacer 10.

It is to be understood that the above described configuration of the inventive spacer 10 can be constructed such that the isolating elastomeric member and the flanges can be reversed end for end. Additionally, it matters not which member comprises the male member or the female member. All such variations are within the scope of the present invention. Of course, the internal configuration of the inventive spacer 10 is to be such that it conforms to the size of the openings in the carburetor and the intake manifold regardless of the exact construction used, even if the carburetor opening and the intake manifold opening are not the same size.

In practice, the isolating spacer serves to dampen and eliminate, or minimize the resonances and vibrations created by the engine and the engine's supporting structure. As a result, a more precise and stable fuel oxidizer mixture curve is achieved throughout the operating RPM range of the engine.

In practice it is preferred that the isolator 23 is made from a polymer such as polyisoprene, although other similar materials can be used. The isolator and spacer construction perform the addition advantage of providing the fuel mixture with a heat barrier that serves to minimize changes in temperature of the fuel mixture and prevent fuel drop out as it progresses from the carburetor to the intake manifold.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved.

I claim:

1. A spacer to be used with a carburetor for atomizing a fuel and mixing an oxidizer with said atomized fuel and an intake manifold for flowing said atomized fuel and oxidizer to cylinders of an internal combustion engine comprising, in combination, a carburetor, a space comprising:

a first member having a first flange and a first elongated hollow portion extending downward from the flange, said first elongated hollow portion ending in a first end, a second member having a second flange and a second elongated hollow portion extending upward from the second flange, said second elongated hollow portion ending in a second end, said first and second elongated hollow portions fitting one within the other with a space between said lifted hollow portions, said flanges being located opposite to each other and extending outward from both elongated hollow portions, a space between said fitted hollow portions and a space between at least one end of one of said hollow portions and one flange, and an elastomeric member fitted within said spaces between said fitted elongated portions.

2. The spacer apparatus of claim 1 wherein said elastomeric member includes a flange-like dampening portion extending outward from an upper end thereof, said flange-like dampening portion being fitted within said space between at least one end of said elongated hollow portions and one flange, said dampening portion being held in place by said fitting of said first and second elongated portions one within the other.

3. The spacer apparatus of claim 1 wherein said first member, said second member, and said elastomeric member are frictionally attached to each other when said depending elongated hollow portion is inserted within said extending elongated hollow portion.

4. The spacer apparatus of claim 1 wherein said first and second extending flanges include openings for attaching said carburetor to said first member and said intake manifold to said second member.

5. The spacer apparatus of claim 1 wherein said first flange extends across first hollow member and includes one or more flow openings through said flange, and within the internal diameter of said hollow member, said one or more openings being configured to enhance the mixing and flow of said atomized fuel and oxidizer from said carburetor to said intake manifold.

6. A spacer apparatus used with a carburetor for atomizing a fuel and mixing an oxidizer with said atomized fuel and an intake manifold for flowing said atomized fuel and oxidizer to cylinders of an internal combustion engine comprising:
- a carburetor,
- a spacer comprising:
  - a first member having a flange and a hollow portion extending downward from the flange,
  - a second member having a flange, and a hollow portion extending upward from the flange said first and second hollow portions fitting one within the other,
  - a first space between said fitted hollow portions, and a second space between at least one end of said hollow portions and one flange, and
  - means fitted within said first and second spaces for isolating the flow of atomized fuel and oxidizer from vibrations and harmonics thereof produced by said engine.

7. Spacer apparatus used with a carburetor for atomizing a fuel and mixing an oxidizer with said atomized fuel and an intake manifold for flowing said atomized fuel and oxidizer to cylinders of an internal combustion engine comprising:
- a carburetor,
- a spacer comprising:
  - a first member having a flange and a hollow portion extending downward from the flange,
  - a second member having a flange and a hollow portion extending upward from the flange,
  - said first and second hollow portions fitting one within the other,
  - a first space between said fitted hollow portions, and a second space between at least one end of said hollow portions and one flange, and
  - means fitted within said first and second spaces for isolating the flow of atomized fuel and oxidizer from heat generated by said engine.

8. The spacer apparatus of claim 5 wherein said one or more flow openings include merged channels that extend downward from said inwardly extending flange and within the hollow portion of an inner elongated hollow portion.

* * * * *